Feb. 13, 1934.  E. A. EVERETT  1,946,785
PORTABLE METAL CUTTING SAW
Filed July 1, 1927  3 Sheets-Sheet 1
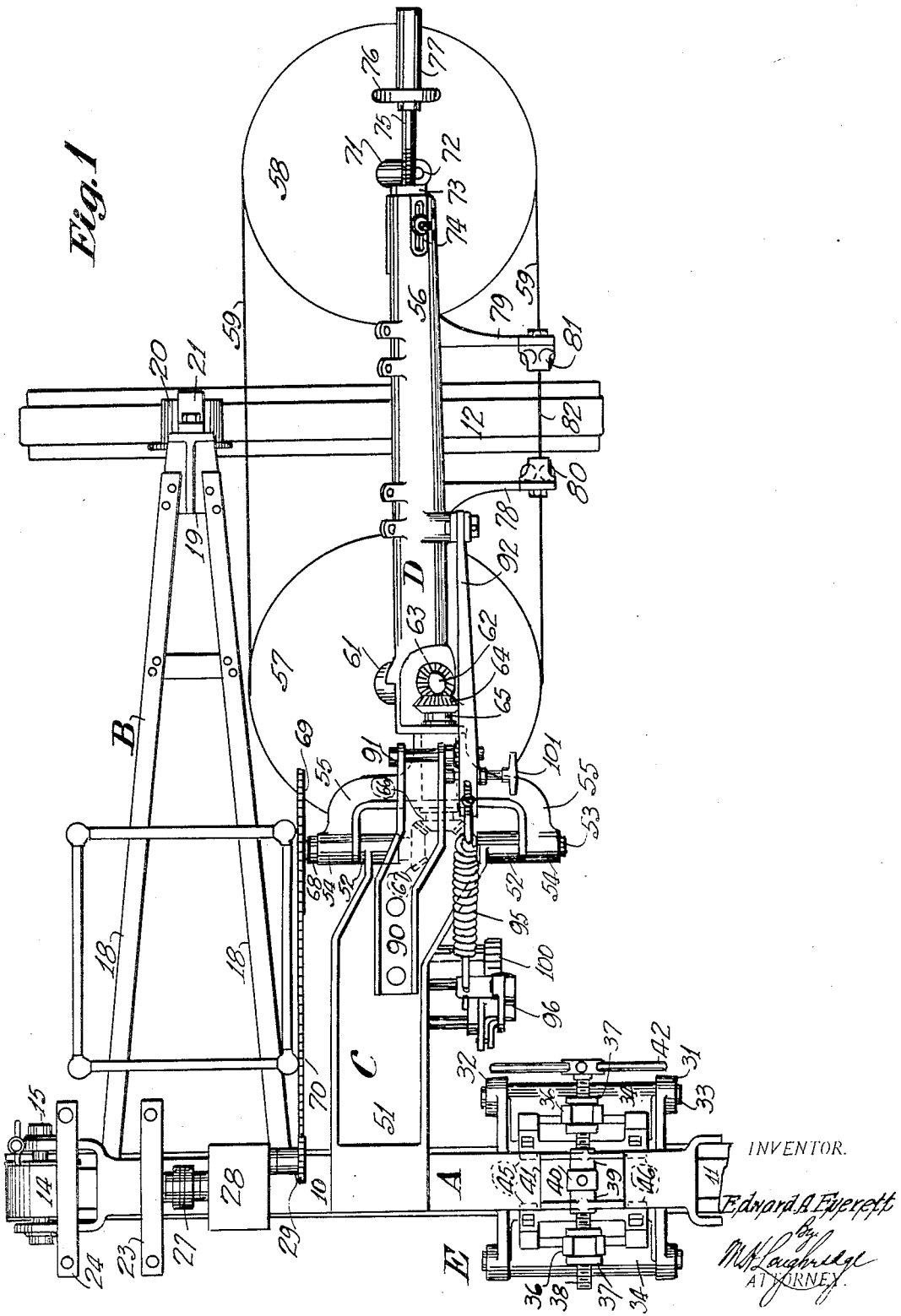
INVENTOR.
Edward A. Everett
By M. Laughridge
ATTORNEY.

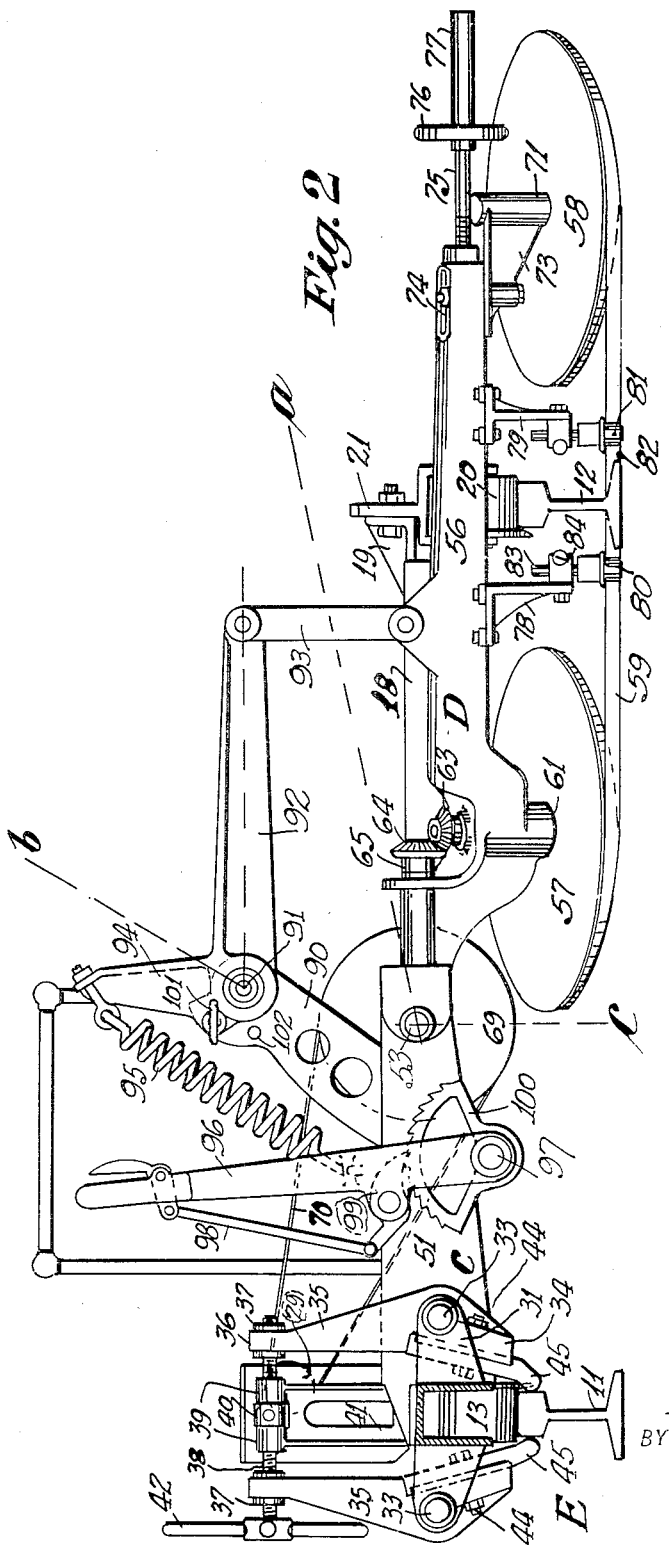

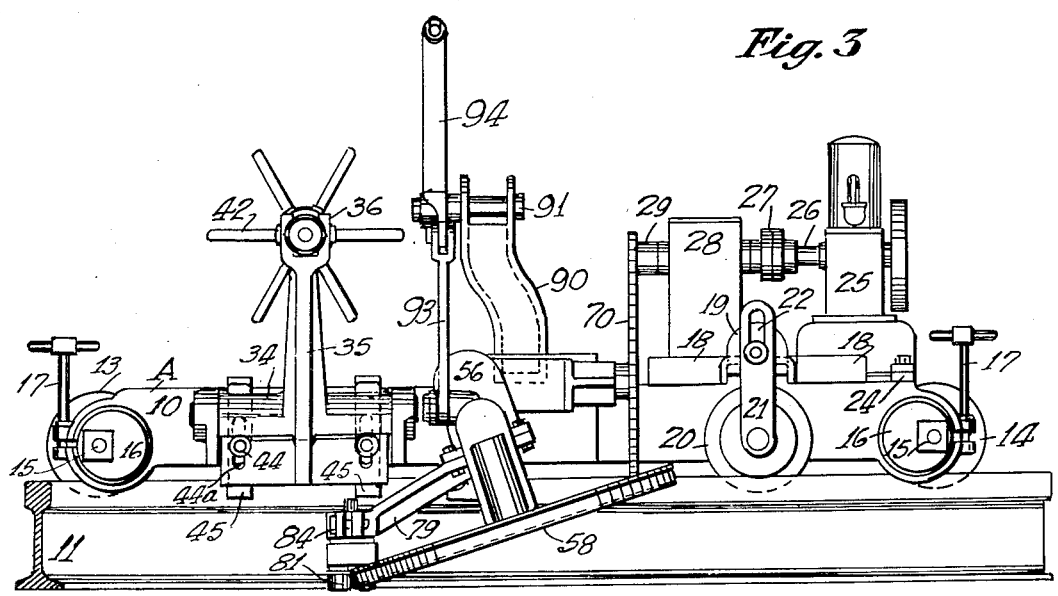

Patented Feb. 13, 1934

1,946,785

UNITED STATES PATENT OFFICE 1,946,785

PORTABLE METAL CUTTING SAW

Edward A. Everett, New York, N. Y.

Application July 1, 1927. Serial No. 202,945

8 Claims. (Cl. 29—68)

This invention relates to portable metal cutting saws and more especially to a form of what is ordinarily known as band saws. A principal object of the invention is to provide a portable machine of the type specified which is supported by the material to be sawn and which is readily movable to the desired sawing position.

A further object of the invention is to provide a portable machine which is supported by a pair of parallel members and braced to one of said members while the saw mechanism is arranged to saw the other member.

A further object of the invention is to provide a machine as specified supported substantially above a pair of horizontal members with means for lowering the sawing mechanism to saw one of said members.

A further object of the invention is to provide a rail cutting saw of the type specified using a band saw on a vertical swinging frame for sawing the rail.

A further object of the invention is to provide a rail cutting saw having a band saw on a swinging frame so adjusted as to cut the rail without extending below the base of the rail.

A further object of the invention is to provide a rail cutting band saw having a pivoted frame for feeding the saw by gravity and a spring adjustment for varying the pressure of the feed.

A further object of the invention is to provide a saw frame carrying a band saw pivotally mounted and means for latching the saw frame in a raised position while the machine is being moved.

Other objects of the invention reside in the construction and arrangement of parts as will appear from the description of the particular physical embodiment of the invention selected to illustrate its working principles and the novel features thereof are pointed out in the appended claims.

The invention is described in detail in the following specification and illustration in the accompanying drawings, in which, Fig. 1 is a plan view of the invention adapted for sawing railway rails in the track, Fig. 2 is a side elevation of the machine shown in Fig. 1 with the saw in the position in which the rail-cut is completed and Fig. 3 is an elevation of the machine looking from the right in Figs. 1 and 2.

The physical embodiment of the invention selected in the drawings to illustrate and explain the working principles of the invention and to show a preferred construction thereof includes, a main frame A having supporting means such as rollers whereby it may be supported on a track rail and also clamping means E whereby it is securely fastened to this rail during the operation of the machine. This main frame is stabilized by a right angle extension B extending across the track and supported by the opposite rail, preferably on a roller so that the entire machine is readily portable by moving it on the track on its roller supports. The saw is supported by a saw frame D and is designed to operate on the rail opposite the main frame and which extends transversely across the track and above the rail to be sawn. The saw frame supporting the band saw wheels is pivotally secured to the main frame A through the extension C in such position that the band saw wheels are equally spaced from the rail to be cut.

A motor is mounted on the main frame A and through a reduction gear and chain drive operates a shaft on the axis of the pivot of the saw frame D which is suitably geared to the band saw wheels. In this way a continuous motor drive is obtained for the band saw as it is fed to the work by gravity through the saw frame moving on its pivot support as the saw cuts into the rail.

The entire machine is supported above the work and with such clearance that the band saw does not extend below the base of the rail at any point during the sawing operation.

In the drawings 11 and 12 are the running rails of a railway track, 13 and 14 are the supporting rollers for the main frame 10. The shafts of these rollers are mounted on eccentric bearings 16 which are clamped in position by the screws 17 so that by rotating the bearings 16 in the frame 10 the height of the frame above the top of the rail is adjusted for different height of rail as hereinafter referred to. The main frame is parallel with the rail and is stabilized on the rail by the cross frame 18, Fig. 1, which is secured to the main frame 10 and terminates in the casting 19 to which the flanged roller 20 bearing on rail 12 is pivotally secured by the bracket 21. This bracket is adjustably positioned through the slot 22, Fig. 3, so that the height of the roller relative to the frame can readily be adjusted.

The main frame is provided with integral cross-bars 23—24 upon which the motor 25 is mounted, which motor through shaft 26, coupling 27, and gear reducing mechanism 28, operates the sprocket wheel 29 and the chain belt 70 to drive the saw as hereinafter more fully described.

The main frame is clamped to the rail 11 prior to starting sawing operations. The clamp comprises a pair of spaced members pivotally supported by the frame and arranged to engage the head of the rail and to oppose a pair of corresponding spaced members on the opposite side of the rail. These members are brought into engagement with the rail by a lever and screw action.

The bearings 31 and 32 are formed integral with the frame 10 and project therefrom to support the shaft 33 of the clamping member 34. The vertical arm 35 is formed integral with 34 and terminates in a jaw at 36 which receives the non-turning bushing 37 threaded for the screw 38. This screw is supported by the bearings 39 of the stand 41 and is held in place by the collar 40 which is keyed to the screw. The clamping member 34 supports the spaced clamping dogs 45 which are adjustably secured to 34 by the bolts 44 in the slots 44a. These dogs engage the head of the rail as shown in Fig. 2 and they are vertically adjustable by the slotted attachment described so that they can be positioned in correct relation to the rail head as the height of the frame is adjusted. It will be noted that the opposing members of the rail clamp are similar in construction and indicated by similar reference characters in the drawings. The screw 38 has a right and left hand thread and is operated by the hand wheel 42. When this wheel is turned in one direction the arms 35 are spread apart to force the clamping dogs into engagement with the rail and when rotated in the opposite direction, these arms are brought towards each other and the clamp is thereby released.

The right angle extension 51 which supports the saw frame may be formed integral with the casting of the main frame. This part is above the level of the track rails and terminates in the spaced bosses 52 which are parallel with the track. The saw frame comprises the horizontal bar 56 extending over the rail 12 which is the rail to be sawn. This bar terminates in a T shaped head 55 having bosses 54 formed thereon to register with the bosses 52 of the frame 51. A hinge pin 53 secures the bosses 52—54 at one side and the bushing 68 pivotally connects these bosses at the opposite side. With this construction it is possible to raise the saw frame 56 through a vertical arc turning on the pivots 53 and 68 while this frame is held rigid laterally to the main frame by the spaced bearings. This provides a rigid frame part clamped to one rail of the track with a portion projecting towards the other rail. To this portion the saw frame is pivoted which supports the band saw wheels, one on either side of the rail to be cut. The cutting edge of the band saw is the lowest point of the entire mechanism and extends below the plane of the supporting frame. As the saw frame is pivoted at its extreme end beyond the edge of the inner saw wheel, it is apparent that as the saw frame is lifted on its supporting pivot no part of the mechanism is brought below the cutting edge.

The saw frame 56 supports the band saw wheel 57 and the band saw wheel 58 upon which the band saw 59 is carried. These wheels are equally spaced from the rail 12 which is to be cut and are inclined from the horizontal as indicated in Fig. 3 so that only one cutting edge of the saw is available for sawing purposes on the rail. The wheel 57 is supported by the boss 61 projecting from 56 and is mounted upon shaft 62, on which the bevel wheel 63 is mounted at the opposite end. This bevel wheel engages bevel wheel 64 on shaft 65 which is parallel with 56 and has its bearing in the casting terminating in 55. The other end of this shaft terminates in the bevel wheel 66 which engages the bevel wheel 67 mounted on a shaft in sleeve 68 and to which the sprocket wheel 69 is secured, driven by the chain belt 70 and by the motor 25 through the reduction gear 22 above referred to. To band wheel 57 is thus gear connected with the motor and thereby the saw is power operated. The band saw wheel 58 is pivoted to the saw frame 56 through the pivot 72 in the boss 71 projecting from the part 73. This wheel aligns with the wheel 57 and on these wheels the band saw is mounted like an endless belt. The tension on the saw is adjusted by the slide 73 which is secured to 56 through the slot 74. This slide carries the boss 71 and may be screw-adjusted through rod 75 and hand wheel 76. A projection 77 of the rod 75 forms a convenient handle by which the operator may raise and lower the saw frame during the progress of the work.

In a modified form of drive the motor is mounted on the frame with its shaft pointing towards the axis of the band wheel 57 and on this axes a worm wheel is mounted. A flexible shaft is directly connected to the motor shaft and to a worm in engagement with the worm wheel which provides the required gear reduction and the speed of the saw is controlled by the speed of the motor.

The saw blade is inclined from the vertical by the inclined supporting wheels and guides are necessary adjacent the cutting portion of the blade to bring the cutting edge into the vertical position. These guides are formed by a pair of rollers 80 adjustably supported by the stem 83 clamped at 84 to the bracket 78 and corresponding rollers on the opposite side of the cutting portion comprising the rollers 81, adjustably supported by the bracket 79. Rollers may also be placed on top of the saw blade over the part where it makes the wide cut in the flange of the rail.

The saw is fed to the work by the weight of the saw frame moving vertically on its pivots as the saw proceeds through the work. In sawing rails and similar articles where the cross-section varies, it is apparent that as the width of the cut varies the speed of the cut will also vary and for this reason it is desirable to be able to regulate the extent of the feed. This is done by a spring which takes up part of the weight of the saw frame. The tension of this spring can be regulated and thereby the weight bearing on the saw blade is regulated.

The bracket 90 is secured to the main frame 51 and its upstanding end supports the pivot bolt 91 upon which the lever 92 is mounted. This lever is linked at 93 to the saw frame 56 as a point which substantially is in the line of the centre of gravity of this frame. By connecting the lifting lever 92 to the saw frame at this point, the stress on the parts is reduced to a minimum and the saw frame in consequence can be made comparatively light. The upturned end 94 of this lever is connected to the coil spring 95, and the other end of this spring is connected to the adjusting lever 96. This adjusting lever is pivoted at 97 and is provided with a latch which, through rod 98, operates the detent 99, pivoted to 96, and releases this lever from the fixed notched quadrant 100 for a free movement to the right. It is apparent from Fig. 2 that lever 96 can be positioned to regulate the tension of spring 95 as desired and thereby take up part of the weight of the saw frame. When not in use it is desirable to raise the saw frame clear of the track and a latch is provided to hold it in this position. The latch rod 101 inserted in a boss in 92 engages the aperture 102 in bracket 90 when lever 92 is raised to the position indicated by b. This is a convenient position for the saw when rolling the machine along the track.

The saw frame in Fig. 2 is shown in its lowermost position with the cutting edge in the horizontal position at the base of the rail. No part of the mechanism is below his point. When starting the saw on top of the rail the saw frame is inclined along the line indicated by a, and as it gradually cuts through the rail it assumes the horizontal position. This is an important feature of my invention and to the end that the saw may be horizontal in its final cutting position on rails of different heights the main frame is adjusted relative to the rail by the eccentric bearings of the supporting rollers so that this result will obtain. It will be noted from Fig. 2 that the inner band saw wheel 57 is located on the saw frame within the pivot axis of this frame, that is, within a line c vertically passing through the pivot 53. Thus, in turning the saw frame about this pivot, the edge of the wheel 57 is not lowered below the position when horizontal. It will also be observed that by maintaining the saw level in its lowest position the outer wheel 58 is not lowered below the position when horizontal, as might occur if the saw frame were tilted downwards in the lowest cutting position. This enables the machine to be used for cutting rail in the track and to operate within the clearance of the ballast line.

In Fig. 1 it will be seen that the cutting portion of the saw 82 is substantially in line with the clamp E which braces the saw frame against movement during the sawing operation and thus insures an even cut of the saw.

This machine is readily moved along the track on its rollers, is quickly clamped in place for sawing and the saw is easily guided to the work. No special preparation of the track is necessary for using the machine which can be quickly removed from the track in cases of emergency.

While the drawings illustrate the preferred embodiment of the machine it is to be understood that my invention is not limited to the specific construction shown but may be varied within the scope of the claims hereof.

Having thus described my invention, I claim:

1. In a portable saw as described, the combination of a main frame supported on rollers to roll on the rails of a railroad track, a saw frame pivotally connected to said main frame substantially midway between the track rails, to extend over one of said track rails and to lift in a vertical direction, a pair of band saw wheels pivotally connected to said saw frame and so located that the outer edge of the inner wheel does not extend beyond the vertical plane of the pivot of said frame and a band saw carried by said wheels and arranged to saw one rail by the movement of said saw frame on its pivot.

2. In a portable rail saw as described, the combination of a main frame supported on the rails of the track, a saw frame pivotally connected to said main frame and extending at right angles thereto, a pair of band saw wheels pivotally supported by said saw frame, a band saw carried by said wheels to saw one of said rails, a lever pivoted to said main frame and linked to said saw frame at a point substantially in line with its centre of gravity and means for operating said lever to raise said saw frame.

3. In a portable saw as described, the combination of a main frame supported on rollers on the rails of a railway track, a saw frame pivotally connected at right angles to said main frame at a point substantially midway between the track rails and carrying a pair of band saw wheels located within the vertical plane of said pivot and the end of said saw frame, a band saw carried by said wheels in position to saw one of said rails, a bevel gear on the shaft of one of said wheels, a shaft parallel with said saw frame, having a bevel gear engaging the gear on said wheels and a shaft on the axis of said pivot geared to said parallel shaft, for driving said band saw wheels.

4. In a portable rail saw as described, the combination of a main frame supported substantially on the rails of a railway track, a motor mounted on said frame, a saw frame pivotally connected to said main frame and extending horizontally over one of the rails, a lever supporting said frame, a pair of band saw wheels pivotally supported by the saw frame, means operatively connecting one of said wheels with said motor, a band saw supported by said wheels to operate upon the rail over which said saw frame extends and adjustable spring means for supporting said frame through said lever.

5. In a portable rail saw as described, the combination of a main frame supported substantially on the rails of a railroad track, a motor mounted on said frame, a saw frame pivotally connected to said main frame at a point substantially mid-way between the rails of the track and extending across the track, a lever pivoted to said main frame, a link, a pair of band saw wheels pivotally supported by said saw frame, means operatively connecting one of said wheels with said motor, a band saw carried by said wheels to saw the rail over which said saw frame extends and fed to the work by gravity, said lever connected by said link with said saw frame and a spring supporting part of the weight of said saw frame through said lever.

6. In a portable rail saw, the combination of a main frame supported on the rails of the track, a saw frame pivotally connected to said main frame and extending transversely across the rail to be cut, a pair of band saw wheels pivotally supported by said saw frame, a band saw carried by said wheels to saw the rail over which said saw frame extends, a lever pivoted to said main frame and supporting said saw frame, an adjusting lever latched to said main frame and a spring connecting said supporting lever with said adjusting lever.

7. In a band saw, the combination of a main frame, a saw frame pivotally connected to said main frame and extending transversely across the material to be cut, a pair of band saw wheels pivotally supported by said saw frame, a band saw carried by said wheels, a supporting lever pivoted to said main frame and supporting said saw frame, an adjusting lever pivoted to said main frame and means operatively connecting said adjusting lever with said supporting lever.

8. In a band saw, the combination of a main frame, a saw frame pivotally connected to said main frame and extending transversely across the material to be cut, a pair of band saw wheels pivotally supported by said saw frame, a band saw carried by said wheels, a supporting lever pivoted to said main frame and supporting said saw frame and an adjusting lever pivoted to said main frame and yieldably connected with said supporting lever.

EDWARD A. EVERETT.